(12) United States Patent
Sumida et al.

(10) Patent No.: US 7,254,152 B2
(45) Date of Patent: Aug. 7, 2007

(54) OPTICALLY PUMPED ACTIVE MIRROR WITH IMPROVED PERFORMANCE AND REDUCED PARASITICS

(75) Inventors: David S. Sumida, Los Angeles, CA (US); David M. Pepper, Malibu, CA (US)

(73) Assignee: HRL Laboratories, LLC, Malibu, CA (US)

( * ) Notice: Subject to any disclaimer, the term of this patent is extended or adjusted under 35 U.S.C. 154(b) by 437 days.

(21) Appl. No.: 10/774,002

(22) Filed: Feb. 6, 2004

(65) Prior Publication Data

US 2005/0175057 A1    Aug. 11, 2005

(51) Int. Cl.
*H01S 3/14* (2006.01)
*H01S 5/00* (2006.01)

(52) U.S. Cl. .................. 372/68; 372/39; 372/50.12
(58) Field of Classification Search .......... 372/50.12, 372/68
See application file for complete search history.

(56) References Cited

U.S. PATENT DOCUMENTS

| | | | |
|---|---|---|---|
| 3,786,368 A | 1/1974 | Bjorkholm et al. | 331/94.5 |
| 3,838,359 A * | 9/1974 | Hakki et al. | 372/45.01 |
| 3,970,960 A | 7/1976 | Mollenauer | 331/94.5 F |
| 3,992,681 A | 11/1976 | Haun, Jr. et al. | 331/94.5 M |
| 4,249,141 A | 2/1981 | Brown et al. | 331/94.5 F |
| 4,757,268 A | 7/1988 | Abrams et al. | 330/4.3 |
| 5,754,572 A | 5/1998 | Pinto et al. | 372/20 |
| 5,926,494 A * | 7/1999 | Pepper | 372/70 |

OTHER PUBLICATIONS

U.S. Appl. No. 10/774,001, filed Feb. 6, 2004, Pepper et al.
Gisen, A., et al., "Scalable Concept for Diode-Pumped High Power Solid-State Lasers," *Applied Physics B 58*, Springer-Verlag, pp. 365-372 (1994).
Le, H.Q., et al., "Scalable High-Power Optically Pumped GaAs Laser," *Appl. Phys. Lett.*, vol. 58, No. 18, pp. 1967-1969 (1991).
"VCSELS," *Optics & Photonics News*, pp. 45-47 (Mar. 2002).
Wagner, J.W., et al., "Theoretical Noise-Limited Sensitivity of Classical Interferometry," *J. Opt. Soc. Am. B*, vol. 4, No. 8, pp. 1316-1326 (Aug. 1987).
Zhang, L., et al., "Characterization of Ion Implanted Waveguides in Nd:YAG," *J. Appl. Phys.*, vol. 69, No. 6, pp. 3440-3446 (Mar. 15, 1991).

* cited by examiner

*Primary Examiner*—Armando Rodriguez
(74) *Attorney, Agent, or Firm*—Ladas & Parry

(57) ABSTRACT

A system and a method for providing more gain while minimizing the potential for parasitic oscillation and amplified spontaneous emissions in an optically pumped optical amplifier or laser system, utilizing a partitioned monolithic gain element. The monolithic gain element being partitioned into discontinuous amplifying gain regions such that parasitic modes and amplified spontaneous emissions are substantially obviated.

23 Claims, 4 Drawing Sheets

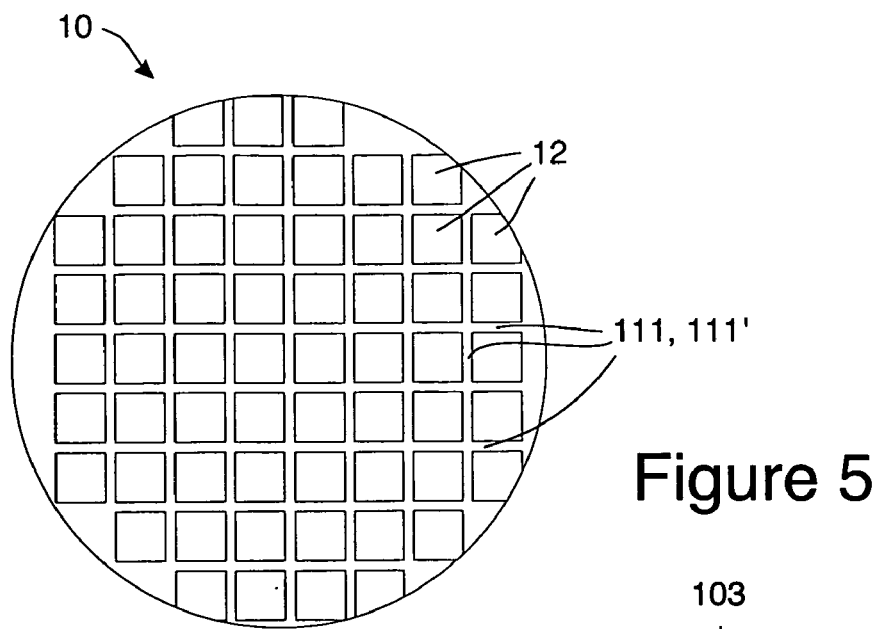
Figure 5
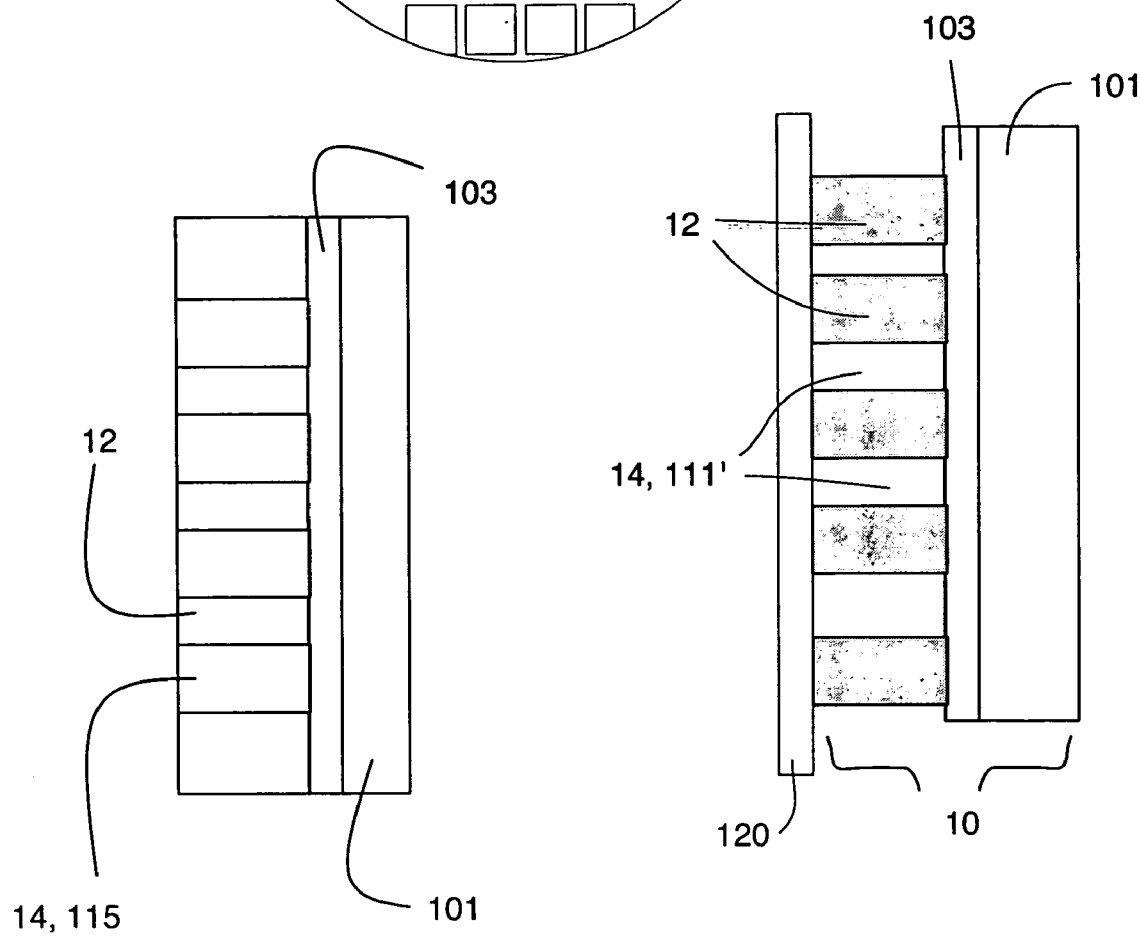
Figure 6
Figure 7

OPTICALLY PUMPED ACTIVE MIRROR WITH IMPROVED PERFORMANCE AND REDUCED PARASITICS

CROSS REFERENCE TO RELATED INVENTIONS

This application is also related to the disclosure of U.S. Pat. No. 5,926,494 to Pepper, which is hereby incorporated by reference. This application is also related to the discloser of U.S. patent application Ser. No. 10/774,001 filed on the same date as this application by Pepper and Sumida entitled "Electrically Pumped Semiconductor Active Mirror with Improved Performance and Reduced Parasitics," which is hereby incorporated by reference.

TECHNICAL FIELD

This present invention relates to the optimization of optical systems that use active mirrors, specifically covering techniques to minimize the potential of parasitic oscillation modes and Amplified Spontaneous Emission (ASE) losses thereby enabling energy or power scaling of active mirror optical amplifiers and lasers.

BACKGROUND OF THE INVENTION

Parasitic oscillation modes and Amplified Spontaneous Emission (ASE) losses limit the choices designers have in designing highly optimized optical systems. For example, in high-power laser welders and in many other industrial and military laser applications, the desire is for an optical output with high gain and/or a great amount of power. However, the state-of-the-art optical systems used in these applications have a high potential for parasitic modes and ASE loss, thus requiring design tradeoffs and use of less efficient optical sources.

A basic optical system in which this invention may be used includes a single element or an ensemble of gain element(s), called active mirrors, and a set of electrical or optical pumping sources. This system may be configured as an oscillator or as a Master Oscillator Power Amplifier (MOPA).

Active mirrors are typically comprised of a thin layer of material that can experience optical gain (i.e. a layer of Nd:YAG, Yb:YAG, or a semiconductor material such as GaAs, in the form of a quantum well or quantum cascade architecture, etc.), which is deposited onto a thin substrate. A highly reflective layer is typically placed in between the active region and the substrate. In general, an optical beam to be amplified impinges this structure, is amplified as it passes through the amplifying layer, reflects from the internal thin reflective layer, and is amplified again as it re-passes through the amplifying layer before emerging from the structure. The active layer can be pumped either optically or electrically depending on the nature of the active layer.

This patent is directed to optically pumped structures. For electrically pumped structures, please see the patent application referred to above. In general, the transverse active region of these active mirrors is limited in scale size due to undesirable parasitic modes that can deplete the stored optical energy (or gain); therefore, they compete for available optical gain with the desired laser mode that is in a direction approximately orthogonal to the transverse dimension. An example of a parasitic mode is an optical beam that propagates, or traverses, in the plane of the active mirror, thereby depleting the optical stored energy.

Conventional laser systems use several approaches to limit or circumvent parasitics and ASE loss mechanisms. One approach involves limiting the physical size of the gain medium, or the transverse spatial extent of the uniform pump beam. The article "Scalable Concept For Diode-Pumped High-Power Solid-State Lasers", by A. Giesen et al., published in *Applied Physics* B 58, 365-372,Springer-Verlag (1994), describes a quasi-three-level laser gain media element that employs thin disk stages attached to coolers. In this application, the size of the surface area of the disk has to be limited due to parasitics, while the thickness is limited by thermal considerations. These limitations in size dictate a reduction in the size of the usable surface area of the gain medium, which results in a lower number of the usable pump photons. See also "Scalable High Power Optically Pumped GaAs Laser", by Le, Di Cecca and Mooadian, published in *Applied Physics Lett.*,Vol. 58,No. 18, 1967-1969,American Institute of Physics (1991). The technology disclosed thereby avoids the limitation of the physical size of the gain medium by partitioning the gain medium.

A second approach for circumventing undesirable transverse losses involves physically sectioning or otherwise modifying a large-size gain medium into a number of smaller discrete gain cells, as is described in U.S. Pat. No. 4,757,268 issued in 1988 to Abrams et al. As an example of physically sectioning a large-size gain medium into a number of smaller discrete gain cells, a large transverse area gain medium, such as Nd:YAG, is longitudinally sectioned or sliced into a number of small segments. In addition, loss elements (e.g. absorbing slabs) may be placed between the gain medium elements to avoid transverse parasitics of the package. Further, this technique also requires coherent combining of the discrete amplifying stages to realize optimal far-field performance, which is usually accomplished via adaptive optics or via nonlinear optical phase conjugation. Unlike this second approach, the invention disclosed herein can be realized using a monolithic structure, as opposed to the discrete gain elements. This results in high optical quality across the active mirror, and, since the entire structure is formed on a common substrate, the need to coherently combine the discrete amplifying states can be avoided.

In a third approach to reducing ASE and parasitic oscillation modes, a large-area wafer with a Multiple Quantum Well (MQW) epilayer, serving as the gain medium, is processed during growth to generate discrete gain regions that can yield gain under optical pumping, while other regions cannot, even in the presence of the pump beams. However, this procedure requires additional processing steps during epilayer growth, which adds cost and complexity to the system, while the invention disclosed herein utilizes conventional photolithographic processing techniques. See U.S. Pat. No. 4,249,141,"Laser Systems Using Pentaphosphate Active Mediums", D. C. Brown, J. Wilson, and assigned to University of Rochester.

A fourth approach for addressing the ASE problem is to employ "optical partitioning" of a single large-area active medium by using an optical pump source with a mask, or other diffractive element, to realize fragmented gain regions, as described in U.S. Pat. No. 5,926,494 issued in 1999 to Pepper. The invention disclosed herein does not require the additional optical elements to map a single large-area optical beam into a prescribed optical pattern for the partitioned pumping, and is not restricted to optically pumped devices.

The Prior Art also Includes:

(1) U.S. Pat. No. 4,757,268,"Energy Scalable Laser Amplifier", by Abrams, et al. and assigned to Hughes Aircraft Company. While this patent describes an array of individual laser gain elements, it does not suggest a monolithic structure.

(2) U.S. Pat. No. 5,926,494,"Laser Systems with Improved Performance and Reduced Parasitics and Method", D. M. Pepper, and assigned to Hughes Electronics Corporation. This patent describes a method of reducing the parasitics via a spatially inhomogeneous optical pump beam, but does not suggest a physical change in the gain medium.

(3) A. Giesen et al., "Scalable Concept For Diode-Pumped High-Power Solid-State Lasers", Applied Physics B 58,pp. 365-372,Springer-Verlag(1994). This reference describes a quasi-three-level laser gain media element that employs thin disk stages attached to coolers, which must be limited in surface area due to parasitics.

(4) H. Le, Di Cecca and Mooradian, "Scalable High Power Optically Pumped GaAs Laser", Applied Physics Lett.,Vol. 58,No. 18, 1967-1969,American Institute of Physics (1991). This discussion also limits the surface area of the gain medium due to parasitics.

BRIEF DESCRIPTION OF THE INVENTION

In one aspect, the present invention provides a gain medium comprising: a substrate; a reflecting layer deposited onto said substrate; and a thin layer of material that can experience optical gain partitioned into discontinuous amplifying gain regions deposited onto said reflecting layer.

In another aspect, the present invention provides a method of minimizing the potential for parasitic oscillation modes and amplified spontaneous emissions, comprising the following steps: fabricating a monolithic gain element; and partitioning said monolithic gain element into discontinuous amplifying gain regions such that parasitic modes and amplified spontaneous emissions are substantially obviated.

In yet another aspect, the present invention provides a laser system, comprising: an input signal beam; at least one pumping source; and at least one monolithic gain medium element having a plane and a normal to the plane, said at least one monolithic gain medium being partitioned into discontinuous amplifying gain regions in order to amplify said input signal beam to produce an amplified output signal beam.

In yet another aspect, the present invention provides a laser system comprising: an input signal beam; at least one pumping source; a plurality of monolithic gain medium elements fabricated to provide a lossy configuration to minimize modes of operation that are substantially lateral to the normal of the plane, while maintaining a high-gain path for a mode of operation that is substantially on-axis to the normal of the plane; and a plurality of amplifier stages comprising a subsequent amplifier stage, each of the amplifier stages comprising said plurality of monolithic gain medium elements, the subsequent amplifier stage comprising at least one second said monolithic gain medium element, said plurality of monolithic gain medium elements each having a plane and a normal to the plane, and each of said plurality of monolithic gain medium elements being adapted to receive the input signal beam and being partitioned into discontinuous amplifying gain regions in order to amplify said input signal beam to produce the amplified output signal beam.

In yet another aspect, the present invention provides a method of increasing gain while minimizing parasitic oscillation modes and amplified spontaneous emission, comprising the following steps: providing a monolithic gain element; partitioning active layer of said monolithic gain element into discrete gain regions and loss regions, the combination of discrete gain regions representing a combined transverse area that can provide a combined gain that is greater than a single gain provided by a single gain region having a single transverse area that is substantially equal in size to the combined transverse area; inputting into the gain medium element an input signal; and providing a high gain-path for the desirable longitudinal mode and at the same time limiting undesirable lateral modes of said input signal.

In yet another aspect, the present invention provides a laser system optimized to produce maximum gain and to minimize the potential for parasitic oscillation modes and amplified spontaneous emission, the laser system comprising: an input signal beam; an amplified output signal beam; a pump beam; and a monolithic gain medium element for receiving the input signal beam, the gain medium comprising a plurality of discrete gain regions and loss regions, the combination of discrete gain regions representing a combined transverse area that can provide a combined gain that is greater than a single gain provided by a single gain region having a single transverse area that is equal in size to the combined transverse area.

BRIEF DESCRIPTION OF THE DRAWINGS

FIG. 5 shows a plan view of the gain medium with the trenches formed therein to define the gain regions between the trenches;

FIG. 6 depicts a cross-sectional view of a monolithic gain medium element used in optical pumping systems, wherein passive regions are ion implanted so as to define optically damaged areas;

FIG. 7 shows a modification to the open trench embodiment of FIGS. 3-5; and

DETAILED DESCRIPTION OF A PREFERRED EMBODIMENT

Figure 1:
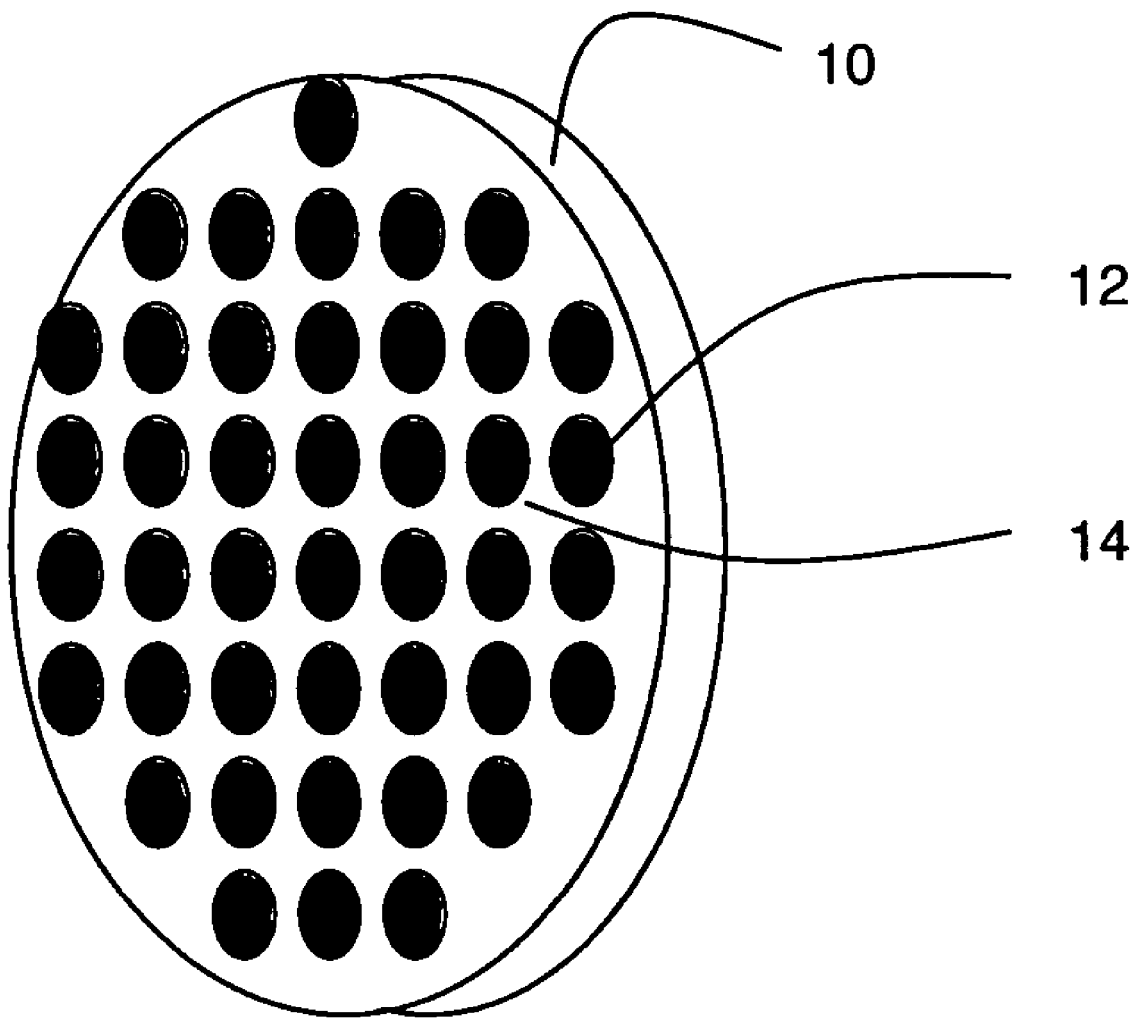
FIG. 1 is a cross-sectional view of a monolithic gain medium element, indicating regions of high gain and regions of loss, used in optical pumping systems.

FIG. 1 depicts a monolithic gain medium element 10 having a plurality of gain regions 12 disposed in a loss region 14. The loss region 14 provides isolation that effectively prevents occurrence of AES loss, after multiple passes through the gain medium element 10. There are a variety of techniques that can be used to fabricate this partitioned monolithic gain medium element, and the preferred choice will be a function of the host and gain medium materials that comprise the active mirror, the specified output power and energy of the system, thermal properties of the elements, the manner in which the system is pumped to realize the optical gain, etc. Independent of the partitioning method of the monolithic gain medium 10, the fill factor, the fractional area of the overall structure that is active versus that which is passive or lossy, can be maximized so that the active mirror is optimally utilized. This fill factor is a function of the ratio of the gain-length product in the gain regions 12 to that of the corresponding optical extinction-length product in the loss region 14. Since these systems all involve scale sizes of many optical wavelengths, conventional photolithographic processing techniques can be employed in the fabrication of the monolithic gain medium 10, as well as in the scaling of the monolithic gain medium 10 to higher powers and energies.

Figures 2, 3:
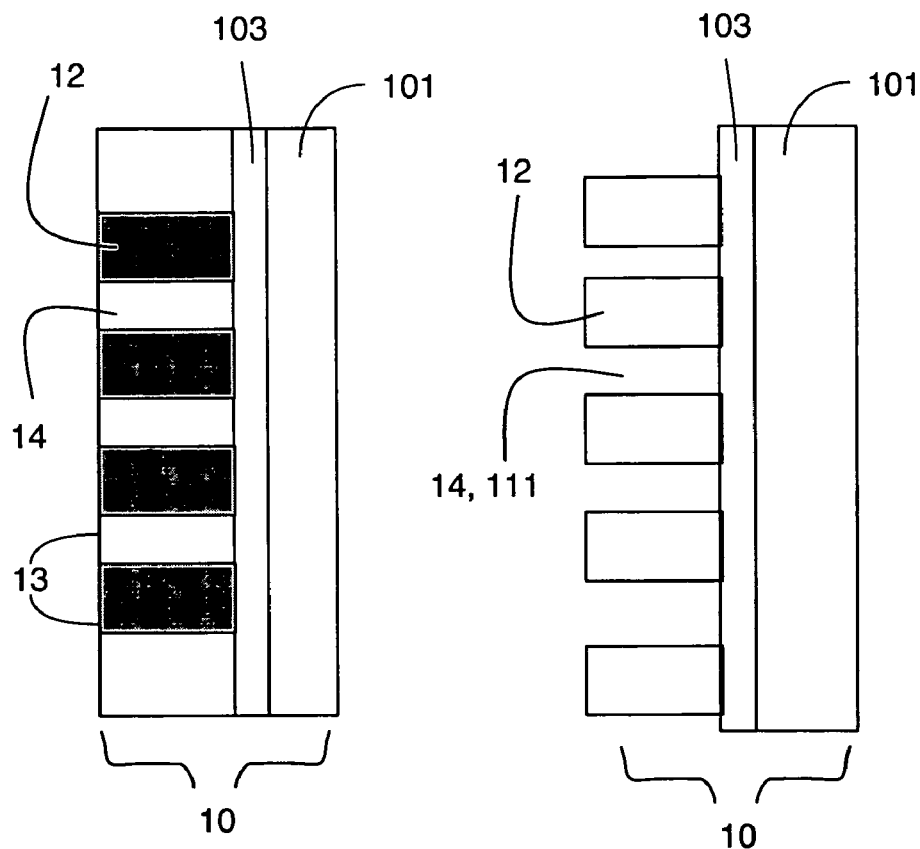
FIG. 2 depicts a cross-sectional view of a monolithic gain element used in optical pumping systems, wherein the active regions are doped.
FIG. 3 depicts a cross-sectional view of a monolithic gain element used in optical pumping systems, wherein the lossy regions are formed via trenches.

FIG. 2 depicts one technique for partitioning the monolithic gain medium 10, where the medium 10 is optically pumped. The gain medium 10 comprises a substrate 101, a reflective layer 103, and a plurality of gain regions 12 and loss/passive regions 14. The gain regions 12 are formed by selectively doping spatial regions 12 of the thin active mirror layer with the laser-active species (e.g. Nd ions), thereby limiting the transverse lasing area. Thus, there would be segmented patches on the surface 13 that would experience gain when a pump source (a laser or lamp) illuminates surface 13. In between these doped regions 12, there are one or more passive or optically lossy region(s) 14 that do not posses the laser-active dopant(s), and, therefore, would not experience optical gain in the presence of the pump source. In the case of a three-level energy system, these passive/lossy region(s) 14 can represent optical loss, so that any laterally propagating optical beam would never get above the parasitic threshold. This follows since the net gain across the surface (including both gain 12 and passive/lossy regions 14) can be designed to be below the ASE limit.

The lossy regions 14 preferably have a finite amount of optical absorption in addition to the ability to scatter light, so that the amount of heat per unit volume which is generated in the lossy medium 14 approximates the amount of heat per unit volume which is generated in the gain regions 12, when the gain medium 10 is in operation, so that any lateral (i.e. transverse) thermal gradient that may occur across the gain medium element 10 is minimized. Minimizing any such lateral thermal gradient has the beneficial effect of minimizing thermo-optical effects.

Beyond merely not doping the passive/lossy regions 14 of the structure 10, there are various fabrication techniques that can render these areas to be isolated or experience additional optical loss, i.e. absorption, scattering, etc., thereby inhibiting lateral ASE parasitic modes from degrading the performance of the gain medium 10. FIG. 3 illustrates one such fabrication technique in which the passive/lossy regions 14 of the structure 10 are formed by open trenches formed in the face of structure 10.

Figure 4:
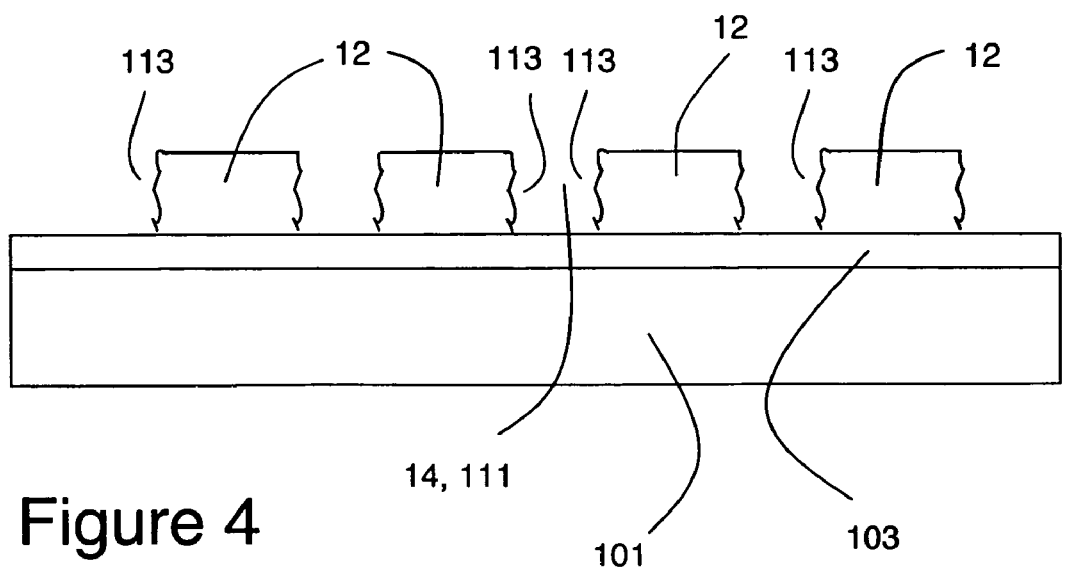
FIG. 4 depicts an exploded view of the trenches shown in FIG. 3.

In FIG. 3 grooves or channels are etched into the structure to form trenches 111. FIG. 4 depicts a close up view of the trenches 111 showing roughened sidewalls 113 on the interior sidewalls of the trenches 111 and FIG. 5 shows a plan view of the gain medium 10 with the trenches 111 formed therein to define the gain regions 12 between the trenches 111. The roughened walls 113, which may be obtained by etching or irradiation techniques, optically isolate transverse regions across the active surface of the gain medium 10 from optically coupling into each other. The roughened walls 113 inhibit lateral whispering gallery parasitic modes from oscillating in the isolated gain regions 12. Further, the roughened walls 113 cause any lateral energy to scatter.

The roughness is approximately on the order of one wavelength (and preferably about one wavelength) of the active mirror signal wavelength in terms of the size of the roughness depth. The effect of this roughness is to maximize the effect of the scattering. Scattering also helps to prevent resonating reflections. By scattering rather than absorbing the lateral energy (which occurs in the case of the embodiment of FIG. 2), hot spots or thermal gradients are eliminated. Hot spots and thermal gradients may cause wavefront distortions resulting in reduced performance. As such, the passive/lossy regions 14 between the gain regions 12 preferably should not highly absorb light at the ASB frequencies, since that leads to localized heating in the loss/passive regions 14 which is believed to lead to optical distortions. Rather, the heat should be removed to the extent that the heat generated in the loss/passive regions 14 is the same as the heat generated in the gain regions 12 so that thermal gradients do not occur across the face of the gain medium 10. Scattering is believed to be a preferable way of accomplishing this end and the roughened sidewalls 113 facilitate light exiting the trench regions 111 and at the same time optically isolate transverse gain regions 12 across the active surface of the gain medium 10 from optically coupling into each other.

Increasing the width of the trenches 111 causes the fill factor (the ratio of the sum of the surface areas of the gain regions to the overall surface area of the gain medium 10) to decrease. Of course, a higher fill factor will usually be desirable. Increasing the width of the trenches also should improve the scattering of the light out of the trenches 111. The optimum width of the trenches 111 will depend on a number of factors. But ideally the trenches 111 should be sufficiently wide that most of the light scatters out of the trench without (i) causing localized heating or (ii) allowing optical coupling between adjacent gain regions 12.

The width of the trenches is typically on the order of hundreds of wavelengths of the optical source that pumps the gain medium 10. The depths of the trenches 111 typically are in the range of one tenth to a few millimeters.

FIG. 5 depicts the trenches 111 intersecting each other at right angles since the gain regions have a square configuration in this particular embodiment. However, the gain regions need not necessarily be square shaped as other shapes will also work, including rectangular, triangular, hexagonal, circular and other geometric shapes. Thus, the trenches 111 need not necessarily intersect one another at the right angles shown in FIG. 5.

FIG. 6 illustrates another fabrication technique to render areas to be isolated or experience additional optical loss is to ion implant the passive/lossy regions 14 as to locally define optically damaged areas, again with the purpose of defeating the possibility of the transverse optical fields from coupling across the active regions 12. In particular, for a laser host such as YAG, the use of ion implantation is well known for the fabrication of a waveguide layer (see L. Zhang et al., *J. Appl. Phys.*, 69, 3440 (1991)). In that case the typical parameters for such a waveguide structure are:

Ion: $He^+$
Energy: 2 MeV
Dosage: $3 \times 10^{16}$ ions/cm$^2$ at 300K
Depth of damage: several microns is typical The damage profile of the decrease in the refractive index as a function of damage depth typically shows a so-called "well and barrier" profile. The implantation preferably causes dislocations to occur in the crystal lattice of the gain medium 10 to thereby define the passive/lossy regions 14 of the gain medium 10. The dislocations in the lattice structure of the gain medium 10 allow light entering those regions 14 to be scattered out of the gain medium 10.

In operation, the gain medium 10 formed by gain regions 12 is pumped by a light source (a laser for example), and the light from the light source will cause heating to occur in the gain regions 12. Indeed, typically 10 to 40% of the adsorbed energy of the light source will be converted to heat in the gain regions 12 thereby causing them to increase, during use, in temperature. Preferably, the same amount of heating should also occur in the passive/lossy regions 14. Thus, the passive/lossy regions 14 should not comprise a highly absorptive material for the light source since the use of such material will cause localized hot spots. Materials or designs that cause the light to scatter out of the passive/lossy regions 14 are preferred. Of course, the scattering will not be 100% efficient and thus some localized heating may occur. But since at least some (20-25%) of the energy of the light source should remain in the passive/lossy regions 14 in order to equalize with the heat being generated in the neighboring gain regions 12, scattering is superior to absorption as a mechanism for optically isolating the gain regions 12 from one another laterally across the gain medium 10.

Since the structure is preferably fabricated from a common element (gain medium 10) using conventional lithographic techniques, a large-scale, monolithic device can be realized with high optical quality across the entire device. The device can be easily mounted on thermo-electric coolers or other heat sinks, if needed.

In addition to inducing scattering in the passive/lossy regions 14 by the ion implantation technique just discussed, dopants can also or alternatively be used in the passive/lossy regions 14 to induce absorption and/or scattering.

FIG. 7 shows a modification to the open trench embodiment of FIGS. 3-5. In this embodiment, the trenches are closed preferably by disposing a diffusion bonded cover 120 over the front of the gain medium 10 in order to seal the trenches to thereby form channels 111' instead. The channels 111' still have the roughened sidewalls 113 as shown by FIG. 4. A liquid can be circulated in the channels 111' in order to conduct heat away from the gain medium 10 and also to help minimize hot spots. The liquid is preferably somewhat absorptive at the frequency of the light source and also able to support scattering. The diffusion bonded cover 120 keeps the liquid from interfering with the light that is amplified in the gain medium 10 as it enters into the gain regions 12. The liquid, which could be an aqueous solution, is preferably pumped through the grid of channels 111' shown in FIG. 5.

Figure 8:
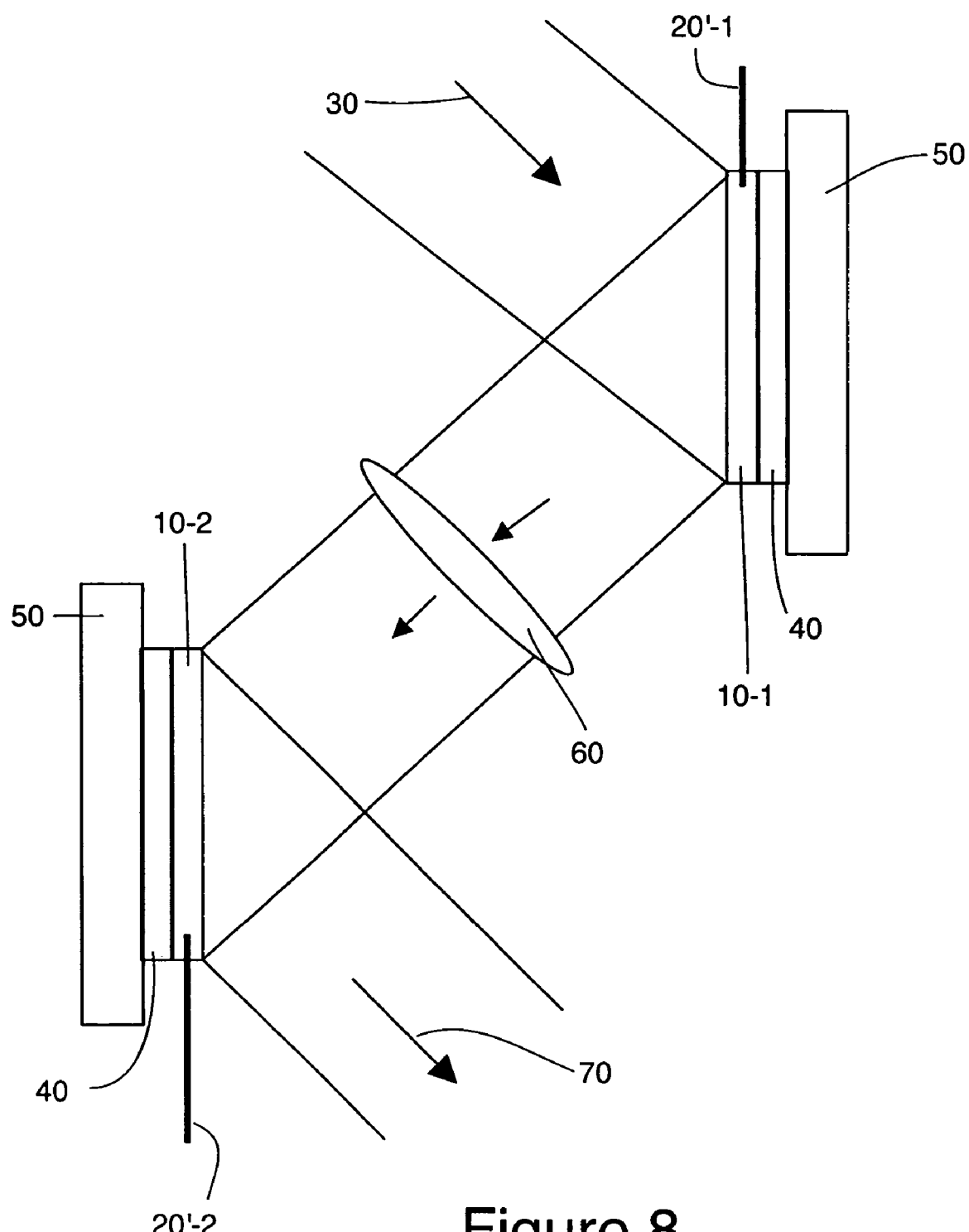
FIG. 8 is an illustration of the basic architecture of an optically pumped active mirror system, using angular decoupling of the input and the amplified output signal beams, each mirror element with partitioned gain region.

In FIG. 8, the basic architecture of an optically pumped active mirror system using angular decoupling of an input signal beam 30 and an amplified output signal beam 70, with simultaneous pumping, by two pump beams 20, 21, of two partitioned monolithic gain elements 10 is illustrated. To differentiate the two gain elements, either a-1 or a-2 have been added to the element numbers used above for this figure. In this optically pumped system the monolithic gain elements 10-1 and 10-2 may have the cross-sectional view as shown in FIGS. 1-6, and fabricated via one of the methods described above for a monolithic gain element used in an optically pumped system.

The partitioned monolithic gain medium element 10 of this invention is preferably a thin amplifying gain medium, e.g. a disk, but it is conceivable that a gain media of different physical shape could be used instead. Each partitioned monolithic gain element 10 is preferably mounted onto a thermally conducting element, represented herein by heat sinks 50 to remove excess heat. The backside of each partitioned monolithic gain medium element 10-1 and 10-2 is coated with a reflective multi-layer dielectric stack 40. Power supply connections and other support hardware typically used with the gain medium elements 10-1 and 10-2 are well known in the art and are not presented herein.

If there is more than one amplifier, as is shown in FIG. 8, an image relay system 60 with gain-medium imaging elements can be used for spatial mapping of gain regions 12 of one monolithic gain medium element 10-1 onto the gain regions 12 of the subsequent gain medium element 10-2.

FIG. 8 is just one example of a variety of laser or optical amplifier systems in which this invention can be utilized. Other examples of this can be found in FIGS. 3-9 in Pepper's previous patent U.S. Pat. No. 5,926,494, herein incorporated by reference. In order to most effectively utilize more than one of these partitioned monolithic gain mediums, the system can incorporate gain-medium imaging elements to relay the amplified signal beam profile onto subsequent gain modules, intracavity phase-corrector plates, and/or phase-conjugate MOPA system. In effect this invention can replace any gain medium in any optical system having an active mirror, with the suggestion that for cascaded gain medium elements, a method for imaging the signal beam pattern from one disk to another, such as the image relay system 60 in FIG. 8, be included for optimal performance.

Having described the invention in connection with a preferred embodiment therefore, modification will now certainly suggest itself to those skilled in the art. As such, the invention is not to be limited to the disclosed embodiments except as required by the appended claims.

What is claimed is:

1. A gain medium comprising:
   a substrate;
   a reflecting layer disposed on said substrate; and
   a layer of gain material disposed on said reflecting layer, said layer of gain material comprising a plurality of optical gain regions and a plurality of optical lossy regions, said plurality of optical lossy regions being lossy at a signal wavelength of the gain medium and isolating the plurality of optical gain regions from one another.

2. The gain medium of claim 1 wherein said plurality of optical gain regions are ion-doped regions.

3. The gain medium of claim 1 wherein said plurality of optical lossy regions are trenches with roughened sidewalls for enhancing scattering light thereat out of said layer of gain material.

4. The gain medium of claim 3 wherein the trenches each have a width which is selected to facilitate the scattering of light at a signal wavelength of the gain medium.

5. The gain medium of claim 1 wherein said plurality of optical lossy regions comprise optically damaged regions enhancing scattering and/or adsorption of light thereat from said layer of gain material.

6. The gain medium of claim 1, wherein said gain medium is optically pumped.

7. A method of minimizing the potential for parasitic oscillation modes and amplified spontaneous emissions, comprising:
   fabricating a monolithic gain element; and
   partitioning said monolithic gain element into a plurality of gain regions and lossy regions, the lossy regions scattering light away from monolithic gain element in order to minimize the creation of localized hot spots when the monolithic gain element is pumped by an optical source.

8. The method of claim 7 wherein said partitioning comprises ion doping to form gain regions.

9. The method of claim 7 wherein said partitioning further comprises etching trenches in said gain element, said trenches having roughened sidewalls to thereby form said lossy regions.

10. The method of claim 7 wherein said partitioning comprises ion doping to form lossy regions.

11. A laser system, comprising:
   an input signal beam;
   at least one pumping source; and
   at least one monolithic gain medium element pumped by said at least one pumping source in order to amplify said input signal beam to produce an amplified output signal beam, the monolithic gain medium element having a substrate; a reflecting layer disposed on said substrate; and a layer of gain material comprising a plurality of gain regions and a plurality of lossy regions, said plurality of lossy regions isolating the plurality of gain regions from one another.

12. The laser system of claim 11 wherein said gain regions are ion doped regions.

13. The laser system of claim 11 wherein said lossy regions comprise trenches with roughened sidewalls for enhancing scattering light thereat out of said layer of gain material.

14. The laser system of claim 13 wherein the trenches each have a width which is selected to facilitate the scattering of light at a signal wavelength of the gain medium.

15. The laser system of claim 11 wherein said lossy regions are optically damaged regions enhancing scattering and/or absorption of light thereat from said layer of gain material.

16. The laser system of claim 11 wherein said gain medium element is optically pumped.

17. A laser system comprising:
   an input signal beam;
   at least one pumping source;
   a plurality of monolithic gain medium elements forming a planar array having a lossy configuration to minimize modes of operation that are substantially transverse to the planar array, while maintaining, a high-gain path for a mode of operation that is substantially normal to the planar array; and
   a plurality of amplifier stages, each of the amplifier stages comprising said plurality of monolithic gain medium elements, a subsequent amplifier stage comprising at least one second said monolithic gain medium element, and each of said plurality of monolithic gain medium elements being adapted to receive the input signal beam, being pumped by said at least one pumping source, and being partitioned into gain regions and lossy regions in order to amplify said input signal beam to produce the amplified output signal beam.

18. The laser system of claim 17 wherein said gain regions are ion doped regions.

19. The laser system of claim 17 wherein said lossy regions are trenches with roughened sidewalls for enhancing scattering light thereat out of said layer of gain material.

20. The laser system of claim 17 wherein said lossy regions are optically damaged regions.

21. The laser system of claim 17 wherein the trenches each have a width which is selected to facilitate the scattering of light at a signal wavelength of the gain medium.

22. The laser system of claim 17 wherein said lossy regions are optically damaged regions enhancing scattering and/or absorption of light thereat from said layer of gain material.

23. The laser system of claim 17, wherein said gain medium is optically pumped.

* * * * *